Patented June 1, 1926.

1,587,060

UNITED STATES PATENT OFFICE.

ARTHUR ZITSCHER, OF OFFENBACH-ON-THE-MAIN, GERMANY, ASSIGNOR TO THE CORPORATION OF CHEMISCHE FABRIK GRIESHEIM-ELEKTRON, OF FRANKFORT-ON-THE-MAIN, GERMANY.

AZODYESTUFFS AND PROCESS OF MAKING SAME.

No Drawing. Application filed November 30, 1923, Serial No. 677,878, and in Germany January 12, 1923.

My invention relates to valuable azodyestuffs, which may be obtained by combining any diazocompound with bis-(2.3-hydroxynaphthoyl) - 4.4' - diamino - 3.3'-dialkyloxy-diaryls of the general formula:

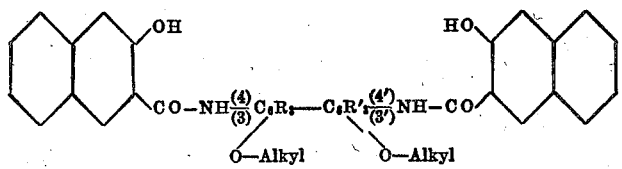

wherein R and R' mean the same or different monovalent substituents.

The especial value of my invention resides in the fact that it yields dyestuffs of a more pronounced brown shade than other dyestuffs, derived from the arylids of 2.3-hydroxynaphthoic acid.

The dyestuffs are when dry brownish red, brown to deep reddish brown powders, insoluble in water, soluble in sulfuric acid to a red to reddish violet solution, yielding upon reduction with stannous chloride two molecular proportions of an aromatic amin and one molecular proportion of a bis-(1-amino-2-hydroxy-3-naphthoyl)-4.4'-diamino-3.3'-dialkyloxydiaryl. The dyestuffs, when produced on the fiber, will dye cotton in brownish red, orange brown to deep brown shades of a very good fastness.

As diazocomponents I may employ in this process e. g. anilin, its homologues and substitution products, such as toluidins, anisidins, chloro- and nitroanilins, chloro- and nitrotoluidins, chloro- and nitroanisidins, naphthylamins, aminoanthraquinones, aminoazobodies, diaminobases and others.

The bis-(2.3-hydroxynaphthoyl) - 4.4'-diamino - 3.3'- dialkyloxydiaryls, not known hitherto, can be obtained by heating 4.4'-diamino - 3.3' - dialkyloxydiaryls together with 2.3-hydroxynaphthoic acid.

The following example illustrates the invention.

Example.

The cotton yarn, well boiled and dried, is impregnated with a solution of 10 gr. of bis- (2.3-hydroxynaphthoyl)-dianisidin, 15 cc. of caustic soda solution of 34° Bé. and 20 cc. of Turkey red oil per liter, well wrung out and developed without drying in a diazosolution, containing 3.3 gr. of 2.5-dichloroanilin per liter, to which sodium acetate has been added, whereupon the yarn is rinsed and soaped while boiling.

In this manner deep orange-brown shades of a very good fastness are obtained. The dyestuff thus produced probably has the formula:

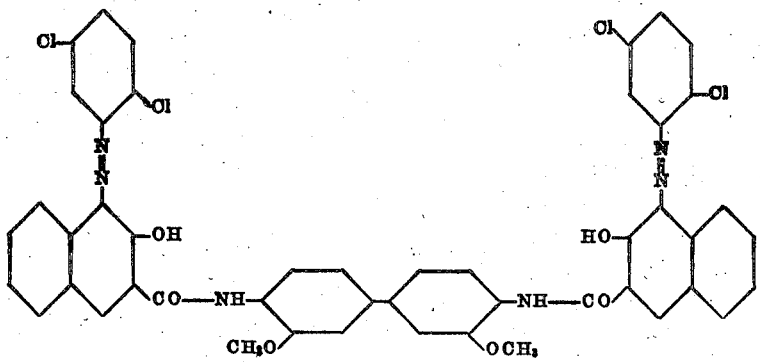

The new dyestuffs can also be produced by printing a diazosolution upon padded goods according to the usual method, also by using the nitrosamin salts of the corresponding bases.

With other diazocompounds and also for example with bis-(2.3-hydroxynaphthoyl)-diphenetidin the process may be conducted similarly.

The following table gives the shades of a number of dyestuffs, prepared according to the present process:

| Diazocompound of— | Combined with— | Shades. | Diazocompound of— | Combined with— | Shades. |
|---|---|---|---|---|---|
| Meta-chloroanilin | Bis-(2.3-hydroxy-naphthoyl)-dianisidin. | Orange-brown. | α-aminoanthraquinone | Bis-(2.3-hydroxy-naphthoyl)-dianisidin. | Reddish brown. |
| 2.5 dichloroanilin | do. (example) | Deep orange-brown. | Meta-aminoazotoluene | do | Deep reddish brown. |
| 3.5-dichloroanilin | do | Do. | Benzidin | do | Puce-brown. |
| 4-chloro-1.2-toluidin | do | Brownish red. | Ortho-tolidin | do | Maroon. |
| 5-chloro-1.2-toluidin | do | Do. | Dianisidin | do | Purplish brown. |
| 4-chloro-1.3-toluidin | do | Reddish brown. | Meta-chloroanilin | Bis-(2.3-hydroxy-naphthoyl)-diphenetidin. | Reddish brown. |
| 4-chloro-1.2-anisidin | do | Brownish dark red. | | | |
| 4-nitro-1.2-toluidin | do | Orange-brown. | | | |
| 5-nitro-1.2-toluidin | do | Reddish dark brown. | 2.5-dichloroanilin | do | Deep orange-brown. |
| 3-nitro-1.4-toluidin | do | Reddish brown. | 3.5-dichloroanilin | do | Reddish brown. |
| 4-nitro-1.2-anisidin | do | Do. | 5-nitro-1.2-toluidin | do | Do. |
| 5-nitro-1.2-anisidin | do | Dark reddish brown. | 3-nitro-1.4-toluidin | do | Brownish red. |
| 5-nitro-1.3-anisidin | do | Deep brown. | 4-nitro-1.2-anisidin | do | Reddish brown. |
| 4-chloro-2-nitroanilin | do | Reddish brown. | 5-nitro-1.2-anisidin | do | Brownish dark red |
| 5-chloro-2-nitroanilin | do | Brown. | 4-chloro-2-nitroanilin | do | Dark reddish brown. |
| 2-chloro-4-nitroanilin | do | Dark brown. | 5-chloro-2-nitroanilin | do | Orange-brown. |
| 3-chloro-4-nitroanilin | do | Brown. | 2-chloro-4-nitroanilin | do | Brown. |
| 3.5-dinitroanilin | do | Do. | 3-chloro-4-nitroanilin | do | Do. |
| 4-nitro-anthranilic acid methyl ester. | do | Reddish brown. | 3.5-dinitroanilin | do | Orange-brown. |
| 5-nitro-3-aminobenzoic acid ethyl ester. | do | Do. | α-aminoanthraquinone | do | Reddish brown. |
| | | | Meta-aminoazotoluene | do | Deep reddish brown. |

When a diazocompound of meta-aminoazotoluene is combined with bis-(2.3-hydroxynaphthoyl)-dianisidin, the resulting dyestuff probably has the formula:

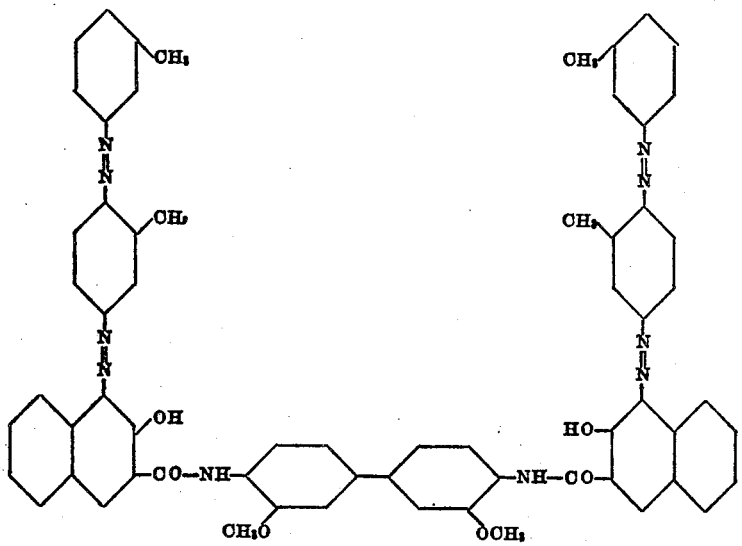

When a diazocompound of benzidin is combined with bis-(2.3-hydroxynaphthoyl)-dianisidin, the resulting dyestuff probably has the formula:

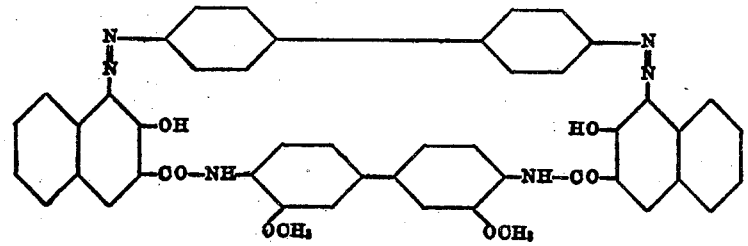

When a diazocompound of α-aminoanthraquinone is combined with bis-(2.3-hydroxynaphthoyl)-diphenetidin, the resulting dyestuff probably has the formula:

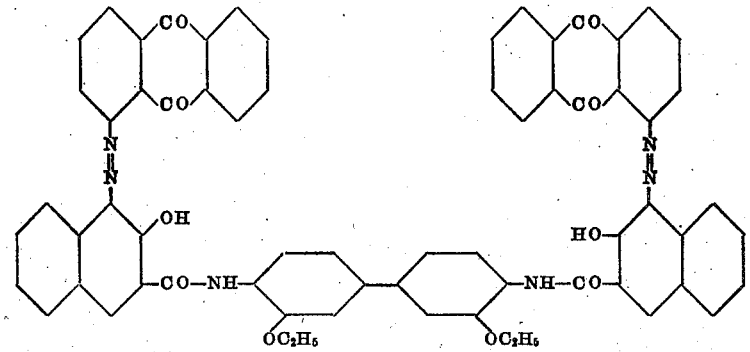

Now what I claim and desire to secure by Letters Patent is the following:—

1. As new articles the azodyestuffs, having probably the general formula:

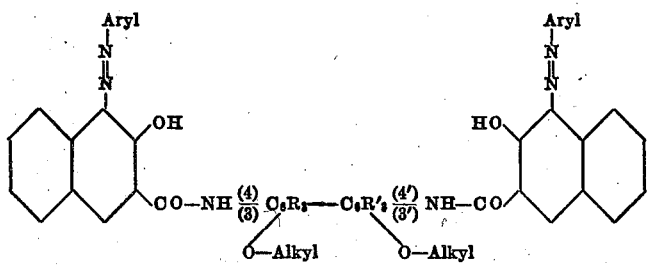

wherein R and R' mean the same or different monovalent substituents, which are when dry brownish red, deep reddish brown to brown powders, insoluble in water and soluble in sulfuric acid to a red to reddish violet solution, yielding upon reduction with stannous chlorid two molecular proportions of an aromatic amin and one molecular proportion of a bis-(1-amino-2-hydroxy-3-naphthoyl)-4.4'-diamino-3.3'-dialkyloxydiaryl, said dyestuffs giving, when produced on the fiber, brownish red, orange-brown to deep brown shades of a very good fastness on cotton.

2. A process of making azodyestuffs consisting in combining any diazocompound with a bis-(2.3-hydroxynaphthoyl)-4.4'-diamino-3.3'-dialkyloxydiaryl having probably the general formula:

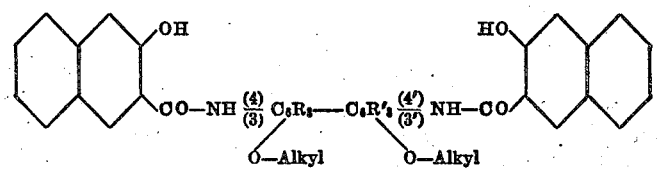

wherein R and R' mean the same or different monovalent substituents.

3. Materials dyed with the new azodyestuffs according to claim 1, said dyestuffs being developed on the fiber of the material.

4. As new articles the azodyestuffs, having probably the general formula:

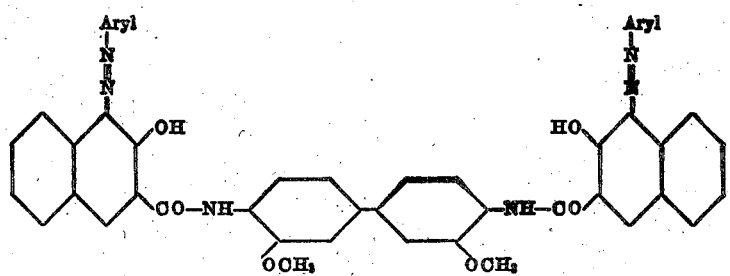

which are when dry brownish red, deep reddish brown to brown powders, insoluble in water and soluble in sulfuric acid to a red to reddish violet solution, yielding upon reduction with stannous chloride two molecular proportions of an aromatic amin and one molecular proportion of bis-(1-amino-2-hydroxy-3-naphthoyl)-dianisidin, said dyestuffs giving, when produced on the cotton fiber, brownish red, orange-brown to deep brown shades of a very good fastness.

6. Materials dyed with the new azodyestuffs according to claim 4, said dyestuffs being developed on the fiber of the material.

5. A process of making azodyestuffs consisting in combining any diazocompound with bis-(2.3-hydroxynaphthoyl)-dianisidin, having probably the formula:

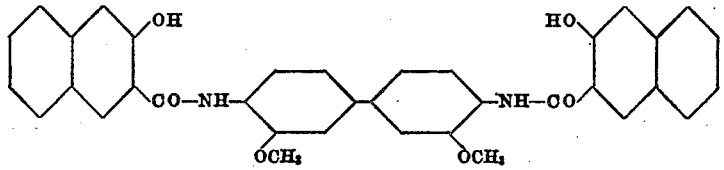

7. As a new article the azodyestuff, having probably the formula:

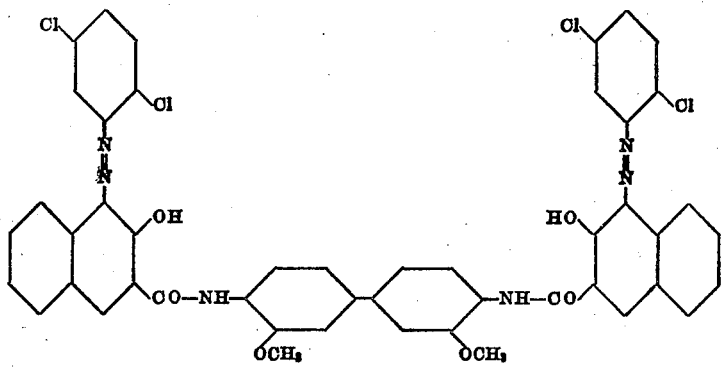

which is when dry a brownish red powder, insoluble in water and soluble in sulfuric acid to a reddish violet solution, yielding upon reduction with stannous chloride two molecular proportions of 2.5-dichloroanilin and one molecular proportion of bis-(1-amino-2-hydroxy-3-naphthoyl)-dianisidin, said dyestuff giving, when produced on the cotton fiber, deeply orange-brown shades of a very good fastness.

8. A process of making an azodyestuff consisting in combining the diazocompound of 2.5-dichloroanilin with bis-(2.3-hydroxynaphthoyl)-dianisidin.

9. Materials dyed with the new azodyestuff according to claim 7, said dyestuff being developed on the fiber of the material.

In testimony, that I claim the foregoing as my invention, I have signed my name, this 15th day of November 1923.

ARTHUR ZITSCHER.